(12) United States Patent
Ferrando et al.

(10) Patent No.: US 6,773,851 B1
(45) Date of Patent: Aug. 10, 2004

(54) SYNTHESIS OF LI2MN4O9 USING LITHIUM PERMANGANATE PRECURSOR

(75) Inventors: William A. Ferrando, Arlington, VA (US); William P. Kilroy, Dayton, MD (US); Steven Dallek, Beltsville, MD (US)

(73) Assignee: The United States of America as represented by the Secretary of the Navy, Washigton, DC (US)

( * ) Notice: Subject to any disclaimer, the term of this patent is extended or adjusted under 35 U.S.C. 154(b) by 164 days.

(21) Appl. No.: 10/184,872

(22) Filed: Jul. 1, 2002

(51) Int. Cl.[7] .......................... H01M 4/50; H01M 4/58; C01D 1/02; C01D 45/12

(52) U.S. Cl. ................. 429/224; 423/594.13; 423/599; 429/231.95

(58) Field of Search ........................... 429/224, 231.95; 423/599, 599.15

(56) References Cited

U.S. PATENT DOCUMENTS

| | | | | |
|---|---|---|---|---|
| 5,316,877 A | * | 5/1994 | Thackeray et al. | 429/338 |
| 5,658,693 A | * | 8/1997 | Thackeray et al. | 429/224 |
| 6,183,910 B1 | * | 2/2001 | Praas et al. | 429/224 |

OTHER PUBLICATIONS

Dallek, Steven "Characterization of $Li_2Mn_4O_9$ Cathode Material by Thermogravimetry", Proceedings of the 38th Power Sources Conference, Jun. 8–11, 1998, pp. 378–381.
Kilroy, W.P., Ferrando, W.A., Dallek, S. "Synthesis and Characterization of $Li_2Mn_4O_9$ Cathode Material", IMLB Conference, Como, Italy, Abstract No. 141, May 28–Jun. 2, 2000. Abstract became available to the public on the Internet Mar. 1, 2000 prior to IMLB conference.
Kilroy, W.P., Ferrando, W.A., Dallek, S. "Synthesis and Characterization of $Li_2Mn_4O_9$ Cathode Material", Journal of Power Sources 97–98 Jul. 10, 2001 pp. 366–343.
Dallek, S., Kilroy, W.P., Ferrando, W.A., "Thermogravimetry and Solid State Synthesis of $Li_2Mn_4O_9$ Cathode Material", 7th Workshop for Battery Development, Phil., PA, Jun. 25–28, 2001.
Kock, A de, Rossouw, M.H., Picciotto, L. A. de, Thackeray, M.M. "Defect Spinels in the System $Li_2O.yMnO_2$ (y>2.5): A Neutron–Diffraction Study and Electrochemical Characterization of $Li_2Mn_4O_9$", Mat. Res. Bull., vol. 25, pp. 657–664 1990.
Thackeray, M.M., Kock, A. de, Rossouw, M.H. and Liles, D., "Spinel Electrodes from the Li–Mn–O System for Rechargeable Lithium Battery Applications", J. Electrochem. Soc., vol. 139, No. 2, Feb. 1992.
Thackeray, M.M. and Kock, A. de, David, W.I.F., "Synthesis and Structural Characterization of Defect Spinels in the Lithium–Manganese–Oxide System", Mat. Res. Bull., vol. 28, pp. 1041–1049, 1993.
Tarascon, J.M., McKinnon, W.R., Coowar, F., Bowmer, T.N., Amatucci, G. and Guyomard, D., "Synthesis Conditions and Oxygen Stoichiometry Effects on Li Insertion into the Spinel $LiMn_2O_4$", J. Electrochem. Soc., vol. 141, No. 6, Jun. 1994.
Gummow, R.J., Kock, A. de, Thackeray, M.M. "Improved Capacity Retention in Rechargeable 4 V Lithium/lithium–manganese Oxide (Spinel) Cells", Solid State Ionics 69, pgs 59–67, 1994.

(List continued on next page.)

Primary Examiner—Stanley S. Silverman
Assistant Examiner—Jonas N. Strickland
(74) Attorney, Agent, or Firm—Jane Barrow (57) ABSTRACT

$Li_2Mn_4O_{8+z}$, with z greater than zero and less than one, is prepared from $LiMnO_4$ and an appropriate complimentary compound, such as MnOOH, $MnO_2$ or $MnCO_3$ precursors. The $Li_2Mn_4O_{8+z}$ is useful in highly oxidized lithium manganospinels.

9 Claims, 8 Drawing Sheets

Li-Mn-O PHASE DIAGRAM

OTHER PUBLICATIONS

Thackeray, M.M. and Rossouw, M.H., "Synthesis of Lithium–Manganese–Oxide Spinels: A Study by Thermal Analysis", Journal of Solid State Chemistry 113, pp. 441–443, 1994.

Masquelier, Christian, Tabuchi, Mitsuharu, Ado, Kazuaki, Kanno, Ryoji, Kobayashi, Yo, Maki, Yuzuru, Nakamura, Osamu and Goodenough, John B., "Chemical and Magnetic Characterization of Spinel Materials in the $LiMn_2O_4$–$Li_2Mn_4O_9$–$LI_4Mn_5O_{12}$ System", Journal of Solid State Chemistry 123, pp. 255–266, 1996.

Xia, Yongyao and Yoshio, Masaki, "Optimization of Spinel $Li_{1+x}Mn_{2-y}O_4$ as a 4 V Li–Cell Cathode in Terms of a Li–Mn–O Phase Diagram", J. Electrochem. Soc., vol. 144, No. 12, Dec. 1997.

Gabano, J.P., Takehara Z., and Bro, P., editors, "Primary and Secondary Ambient Temperature Lithium Batteries", The Electrochemical Soc., Proceedings vol. 88–6, pp. 557–564 (1988).

Thackeray, M.M., "Developments in Rechargeable $MnO_2$ Electrodes For Lithium Batteries", Proceedings of MRS Symposium, Boston, Nov./Dec. 1988, vol. 135, pp. 585–596 (1989).

* cited by examiner

Chemical analysis of lithium manganospinels[a]

| Sample | T (°C) | Time (h) | %Li | %Mn$^{4+}$ | %Mn$^{3+}$ | m | x | y | Spinel Composition Li$_{1-x}$Mn$_{2-y}$O$_4$ | Z in nominal Li$_2$Mn$_4$O$_{8+z}$ |
|---|---|---|---|---|---|---|---|---|---|---|
| A. Oxygen-rich | | | | | | | | | | |
| 1A | 400 | 17 | 3.70 | 38.66 | 19.12 | 3.669 | 0.029 | 0.084 | [Li$_{0.971}$☐$_{0.029}$]$_{8a}$[Mn$_{1.916}$☐$_{0.084}$]$_{16d}$O$_4$ | 0.35 |
| 1B | 400 | 17 | 3.70 | 40.90 | 16.38 | 3.714 | 0.032 | 0.107 | [Li$_{0.968}$☐$_{0.032}$]$_{8a}$[Mn$_{1.893}$☐$_{0.107}$]$_{16d}$O$_4$ | 0.45 |
| 1C | 400 | 17 | 3.70 | 41.27 | 16.52 | 3.714 | 0.042 | 0.104 | [Li$_{0.958}$☐$_{0.042}$]$_{8a}$[Mn$_{1.896}$☐$_{0.104}$]$_{16d}$O$_4$ | 0.44 |
| 3A | 390 | 21 | 3.73 | 43.17 | 15.23 | 3.739 | 0.047 | 0.115 | [Li$_{0.953}$☐$_{0.047}$]$_{8a}$[Mn$_{1.885}$☐$_{0.115}$]$_{16d}$O$_4$ | 0.49 |
| 4A | 390 | 39 | 3.73 | 44.13 | 13.63 | 3.764 | 0.046 | 0.128 | [Li$_{0.9954}$☐$_{0.046}$]$_{8a}$[Mn$_{1.872}$☐$_{0.128}$]$_{16d}$O$_4$ | 0.55 |
| 4B | 390 | 48 | 3.75 | 45.29 | 12.23 | 3.788 | 0.041 | 0.141 | [Li$_{0.959}$☐$_{0.041}$]$_{8a}$[Mn$_{1.859}$☐$_{0.141}$]$_{16d}$O$_4$ | 0.61 |
| 5A | 365 | 41 | 3.60 | 45.05 | 13.36 | 3.770 | 0.083 | 0.121 | [Li$_{0.917}$☐$_{0.083}$]$_{8a}$[Mn$_{1.879}$☐$_{0.121}$]$_{16d}$O$_4$ | 0.52 |
| 5B | 365 | 67 | 3.60 | 47.25 | 10.63 | 3.816 | 0.086 | 0.143 | [Li$_{0.914}$☐$_{0.086}$]$_{8a}$[Mn$_{1.857}$☐$_{0.143}$]$_{16d}$O$_4$ | 0.62 |
| 5C | 365 | 122 | 3.63 | 45.84 | 13.02 | 3.778 | 0.077 | 0.127 | [Li$_{0.923}$☐$_{0.077}$]$_{8a}$[Mn$_{1.873}$☐$_{0.127}$]$_{16d}$O$_4$ | 0.54 |
| 6A | 365 | 40 | 3.76 | 50.25 | 7.18 | 3.876 | 0.057 | 0.179 | [Li$_{0.943}$☐$_{0.057}$]$_{8a}$[Mn$_{1.821}$☐$_{0.179}$]$_{16d}$O$_4$ | 0.79 |
| 6B | 365 | 117 | - | - | - | 3.910 | - | - | - | 0.85 |
| 6C | 365 | 165 | 3.69 | 52.89 | 4.38 | 3.924 | 0.080 | 0.200 | [Li$_{0.92}$☐$_{0.080}$]$_{8a}$[Mn$_{1.80}$☐$_{0.20}$]$_{16d}$O$_4$ | 0.88 |
| B. Lithium-rich | | | | | | | | | | |
| 2 | 400 | 70 | 3.84 | 43.41 | 12.53 | 3.776 | 0.10 | 0.14 | [Li$_{1+x}$Mn$_{2-y}$O$_4$ [Li]$_{8a}$[Mn$_{1.85}$☐$_{0.014}$Li$_{0.01}$]$_{16d}$O$_4$ | 0.62 |

[a] Where m is average oxidation state of Mn and z shows the extent of oxidation of nominal Li$_2$Mn$_4$O$_{8+z}$. Samples were prepared under flowing oxygen except sample 1A, which was heated in air, and sample 1C, which was heated under ozone. Sample 2 was prepared using a combination of flowing oxygen and 30% H$_2$O$_2$. Samples 3, 4, 5 were intermittently ground. Sample 6 was prepared using anhydrous LiMnO$_4$. Sample 6B was analyzed by TG.

Determination of $Li_2Mn_4O_x$ Stoichiometry by TGA

SYNTHESIS OF LI2MN4O9 USING LITHIUM PERMANGANATE PRECURSOR

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to the synthesis of $Li_2Mn_4O_{8+z}$, with z greater than zero and less than one, prepared from $LiMnO_4$ and an appropriate complimentary compound, such as MnOOH, $MnO_2$ or $MnCO_3$ precursors, and its use in highly oxidized lithium manganospinels.

2. Brief Description of the Related Art

Lithium manganospinels have been investigated as lithium insertion cathodes for lithium-ion batteries (see e.g., A. de Kock, M. H. Rossouw, L. A. de Picciotto, M. M. Thackeray, W. I. F. David and I. M. Ibberson. *Mater. Res. Bull.* 25 (1990); M. M. Thackeray, A. de Kock, M. H. Rossouw, D. Liles, R. Bittihn and D. Hoge. *J. Electrochem. Soc.* 139 (1992); M. M. Thackeray and M. H. Rossouw. *J. Solid State Chem.*113 (1994); M. M. Thackeray, A. de Kock and W. I. David. *Mat. Res. Bull.* 28 (1993); M. M. Thackeray and M. H. Rossouw. *J. Solid State Chem.* 113 (1994); and R. J. Gummow, A. de Kock and M. M. Thackeray. *Solid State Ionics* 69 (1994)). The difficulty in preparing the fully oxidized material $Li_2Mn_4O_9$, in a reproducible manner, is well known (see e.g., C. Masquelier, M. Tabuchi, K. Ado, R. Kanno, Y. Kobayashi, Y. Maki, O. Nakamura and J. B. Goodenough. *J. Solid State Chem.* 123 (1996)). Strict control of experimental conditions such as temperature, time, particle size of the precursor materials, and oxygen partial pressure has been essential for producing fully oxidized, single-phase material. Studies to date, however, show clearly that the fully oxidized $Li_2Mn_4O_9$ phase has never been prepared successfully.

Many compounds and synthesis methods have been tried in attempting to produce suitable cathode active materials for rechargeable lithium batteries. Compounds, which function as lithium insertion electrodes, include $LiCoO_2$ and $LiTiS_2$. However, lower cost and higher energy density materials are desirable. In particular, lithium-manganese-oxides contain multiple attractive properties of high cell voltage, long shelf life, wide operating temperature and relatively non-toxicity (see e.g., M. M. Thackeray et al., *J. Electrochem. Soc.* Vol. 139, No. 2, February 1992). Ordinary manganese dioxide, $MnO_2$, cathodes, used in primary lithium/manganese dioxide 3 volt cell, show limited rechargeability in lithium cells. A significant improvement in capacity stability with cycling is obtained with cathodes prepared by reacting gamma $MnO_2$ with lithium hydroxide at moderate temperature (see e.g., N. Furukawa et al. in "Primary and Secondary Ambient Temperature Lithium Batteries", J. Gavitno, Z. Takeharn and P Bro, Editors, PV 8–6, p. 557, The Electrochemical Soc. Softbound Proc. Series, Pennington, N.J. (1988)). This reaction results primarily in the formation of a lithium-manganese oxide spinel component with a cubic close-packed oxygen array, which has been shown to be advantageous over one having a hexagonal close-packing arrangement (see e.g., M. M. Thackeray in "Proceeding of MRS Symposium," boston, November/December 1988, Vol. 135, p. 585 (1989)).

SUMMARY OF THE INVENTION

The present invention includes a process for making $Li_2Mn_4O_{8+z}$, wherein z is greater than zero and less than 1, comprising the steps of mixing lithium permanganate with a precursor selected from the group consisting of MnOOH, $MnO_2$ and $MnCO_3$, and heating the mixture effective to form $Li_2Mn_4O_{8+z}$, wherein z is greater than zero and less than 1.

The present invention also includes $Li_2Mn_4O_{8+z}$, wherein z is greater than zero and less than 1, produced by the process of the present invention.

Furthermore, the present invention includes $Li_2Mn_4O_{8+z}$, wherein z is greater than 0.65, and $Li_2Mn_4O_{8+z}$, wherein z is less than 0.88.

Additionally, the present invention includes a cathode comprising the $Li_2Mn_4O_{8+z}$ made by the present process.

BRIEF DESCRIPTION OF THE DRAWINGS

FIG. 4 shows a chart having chemical analysis of lithium manganospinels of the present invention;

DETAILED DESCRIPTION OF THE PREFERRED EMBODIMENT

The present invention provides a highly oxidized lithium manganospinel using $Li_2Mn_4O_{8+z}$, with z greater than zero and less than one, prepared from solid state synthesis of $LiMnO_4$ and an appropriate complimentary compound, such as MnOOH, $MnO_2$ or $MnCO_3$ precursors. The present invention also provides for novel process of making the $Li_2Mn_4O_{8+z}$.

It is a desirable feature in choosing the lithium spinel structure for insertion electrode is possession of a three-dimensional interstitial space for $Li^+$ transport, which remains intact over a wide compositional range as lithium is added. Selection of a stable spinel for the electrode operating environment, while at the same time, choosing the defect spinel with the highest insertion void volume maximizes the deliverable energy density of a given cathode material.

Figure 1:
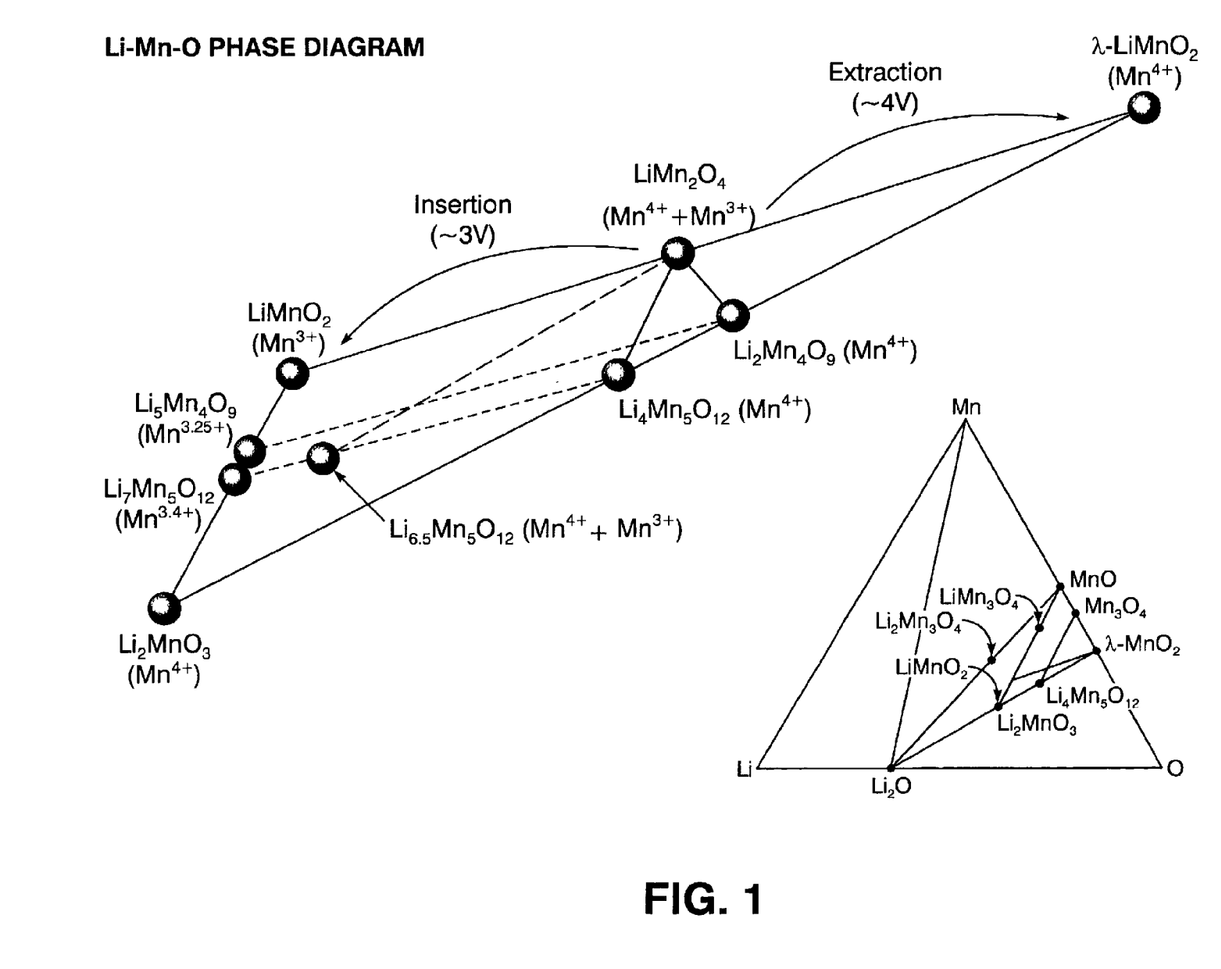
FIG. 1 shows a portion of the ternary phase diagram of the Li—Mn—O system.

As seen in FIG. 1, a portion of the ternary phase diagram of the Li—Mn—O system has those compounds containing Mn of near +4 valence in a shaded area, e.g., $Li_2Mn_4O_9$ and higher oxides. These compounds possess the large void structure and high extraction potential of high energy density rechargeable lithium cathodes.

The process of the present invention for making $Li_2Mn_4O_{8+z}$ with z greater than zero and less than 1, includes the steps of mixing lithium permanganate with a precursor of $MnOOH$, $MnO_2$ or $MnCO_3$ and heating the mixture effectively to form $Li_2Mn_4O_{8+z}$. Preferably, the lithium permanganate and precursor are mixed in approximately stoichiometric amounts. Stoichiometric amounts of lithium permanganate to $MnOOH$, $MnO_2$ and $MnCO_3$ are 1:1, 1:1 and 1:1, respectively.

Preferably, the lithium permanganate comprises a hydrated form of lithium permanganate of $LiMnO_4.3H_2O$. Other forms of lithium permanganate may be used as determined by one skilled in the art in light of the disclosure herein. The lithium permanganate and precursor are mixed in thoroughly blended mixture, as more complete mixtures provide increasingly efficient reactions to $Li_2Mn_4O_{8+z}$. Mixing preferably includes grinding, with the grinding preferably at least as effective as fine grinding with a mortar and pestal combination. This mixing provides homogeneity of the mixed constituents and intimate contact of the constituents on a microscopic scale.

The lithium permanganate and precursor are heated, which results in a melt of the lithium permanganate and precursor. As the $LiMnO_4.3H_2O$ precursor forms the melt improved contact occurs among the reactants (see e.g., F. Leroux, D. Guyomard and Y. Piffard. *Solid State Ionics* 80 (1995)). Lithium permanganate liquefies at about 160° C. as it decomposes, allowing this transient phase to "wet" surrounding particles of the precursor which additionally promotes intimate and homogeneous contact among the constituents. Heating temperatures include from about 275° C. or greater, preferably from about 275° C. to about 550° C., and more preferably from about 350° C. to about 425° C. Higher temperatures such as from about 400° C. and greater, increasingly facilitate a decomposition of the $Li_2Mn_4O_{8+z}$. Preferably, this heating step occurs within an oxygen environment, such as an oxygen purge.

$Li_2Mn_4O_{8+z}$, wherein z is greater than zero and less than 1, is produced by the process of the present invention. Preferred values of z include z less than or equal to 0.88, z greater than or equal to 0.35, z greater than 0.65, with more preferred values of z including z from about 0.65 to about 0.88. Significant variables for producing useful and consistent quality material include: time, temperature, processing atmosphere starting constituent materials and mixing homogencity/particle size.

The $Li_2Mn_4O_{8+z}$, of the present invention is particularly useful within a cathode. Preferably, the synthesis of spinel $Li_2Mn_4O_{8+z}$ using a new precursor mixture $LiMnO_4.3H_2O$ and $MnOOH$, $MnO_2$ or $MnCO_3$ is applied in conventional manners, as determinable by one of ordinary skill in the art.

The present invention provides a highly oxidized cathode spinel material, i.e., to maximize the value of z in $Li_2Mn_4O_{8+z}$, and to characterize the material. Thermogravimetry (TG) was employed to determine the optimal experimental conditions for the synthesis of the cathode and the extent of oxidation of the product. The stoichiometry was determined from potentiometric titration and elemental analysis of Li and Mn. The superior electrochemical behavior of the material was demonstrated using coin cells and single cell tests in hermetically sealed glass laboratory cells.

The lithium manganospinels spinels were prepared by solid-state reactions of stoichiometric amounts of thoroughly mixed powders of $LiMnO_4.3H_2O$ (manufactured by Fisher Scientific of Pittsburg. Pennsylvania, under the tradename Lithium Permanganate, Reagent Grade) and $MnCO_3$ (manufactured by Aldrich Chemical Co. of Milwaukee, Wis., under the tradename Manganese Carbonate (99.9%)). The reactions were investigated over a temperature range from 275 to 550° C. in a quartz tube furnace under flowing oxygen. After the optimal temperature range was established, the effects of heating time, grinding, and oxidizing environment on the synthesis were investigated. The precursors were heated at from about 2° C./min to about 5° C./min until the permanganate formed a melt, whereupon the temperature was held constant for about 15 minutes. Heating was continued until the desired calcination temperature was reached. The effects of air, oxygen, ozone/oxygen and the addition of 30% hydrogen peroxide under flowing oxygen as oxidizing environments were examined.

$LiMnO_4$ may be synthesized by anion exchange resin procedure that includes passing a concentrated solution of Fisher Scientific Certified ACS potassium permanganate through a column of Dowex ion exchange resin, HGRNGLi7 from Dow Chemical Company of Midland Mich. The resulting $LiMnO_4$ solution was concentrated by evaporating the water. The product was recrystallized twice from distilled water, and dried under vacuum.

A TA Instruments, Inc. (of Newcastle, Del.), 951 thermogravimetric analyzer was used in this study. The purity and moisture content of the precursor materials were determined by TG measurements in a helium atmosphere. TG measurements of precursor mixtures in oxygen were used to determine the optimal temperatures and times for the bulk synthesis of the spinels in a tube furnace. The extent of the oxidation of the spinel was determined by TG weight loss measurements in helium. Fourier transform infrared (FTIR) spectroscopy was used to analyze the evolved gases from the thermal decomposition of the spinel materials, using a Nicolet 510P spectrometer interfaced to the TG instrument with a heated transfer line.

Chemical analysis of the composition was preformed. Powder X-ray diffraction (XRD) was used to evaluate the purity of the spinel materials. The composition was determined using direct current argon plasma emission spectroscopy (DCP) in combination with potentiometric titration. Lithium content was determined by DCP. Manganese was determined by potentiometric analysis. The oxygen content was determined from the Li and Mn results. The oxidation state of Mn in the spinel was calculated from analysis of the oxidizing power of Mn and the total manganese. The former was determined by dissolving the spinel in an excess of acidified standard ferrous solution and titrating the remaining $Fe^{2+}$ using standard $KMnO_4$. After addition of excess pyrophosphate to convert $Mn^{2+}$ to $Mn^{3+}$, total Mn was determined by potentiometric titration with standard $KMnO_4$. The efficacy of the titrimetric procedure was evaluated from analysis of standard $LiMnO_4$ and a standard ore of manganese. The presence of unreacted $Mn^{2+}$ in the material could be detected by comparing the titrimetric results with those found from the addition of known amounts of $MnCO_3$ to standard samples of $LiMn_2O_4$.

Additionally, the composition was analyzed through electrochemical evaluation. The electrochemical behavior of the spinel material was determined in hermetically sealed glass lab cells containing approximately 0.5 in.² electrodes. The lab cell consisted of a cathode sandwiched between two anodes and separated by two layers of Celgard. All components were assembled in a dry room. The electrolyte was either 1 M LiAsF$_6$ in propylene carbonate or 1 M LiPF$_6$ in a 1:1 mixture of ethylene carbonate (EC) and ethylmethylcarbonate (EMC). The anode was lithium foil on nickel exmet. The cathode was prepared by dissolving polyvinylidene fluoride (PVDF) in a minimum amount of dimethylsulfoxide (DMSO), followed by adding a mixture of super-P carbon and the as-synthesized spinel. Additional DMSO was added to form a thick paste.

The composite cathode included spinel, carbon and PVDF in an 88:8:4 to 85:10:5 weight ratio that was pressed onto Al exmet and dried overnight under vacuum at 135° C. The cathode was initially charged, followed by charge-discharge cycling under galvanostatic conditions. This cathode material was also cycled versus a lithium anode in a coin cell using 1 M LiPF$_6$ in electrolyte consisting of a 5:4:1 ratio of ethylene carbonate-dimethylcarbonate-diethylcarbonate, i.e., EC-DMC-DEC.

Figure 2:
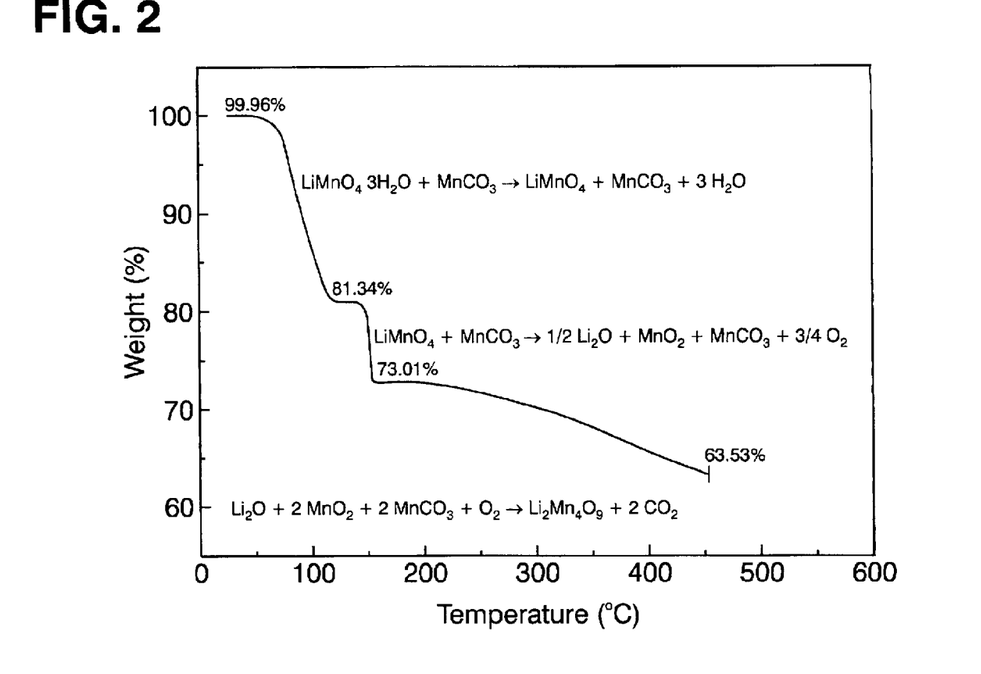
FIG. 2 shows a TG curve of a $LiMnO_4 \cdot 3H_2O + MnCO_3$ mixture at a heating rate of 2° C./min in an oxygen atmosphere.

A preliminary TG experiment was conducted to determine the sequence of reactions in the synthesis of the Li$_2$Mn$_4$O$_9$ cathode material. A TG curve of a 1:1 stoichiometric mixture of LiMnO$_4$·3H$_2$O and MnCO$_3$ is shown in FIG. 2. The sample was heated to 450° C. at a rate of 2° C./min in oxygen. The first weight loss is attributed to the loss of 3 moles of water beginning about 60° C. The second weight loss at ~150° C. was caused by the decomposition of LiMnO$_4$ with the evolution of oxygen. This reaction is extremely exothermic, and slow heating rates and small sample sizes are required to preclude the expulsion of the sample from the TG boat. The final product forms during the third weight loss with the evolution of CO$_2$.

As seen in FIG. 2, a plot shows a TG curve of a LiMnO$_4$·3H$_2$O+MnCO$_3$ mixture at a heating rate of 2° C./min in an oxygen atmosphere. The proposed reactions for the three weight losses shown in FIG. 1 are given by reactions (1), (2) and (3), below.

LiMnO$_4$·3H$_2$O+MnCO$_3$→LiMnO$_4$+MnCO$_3$+3H$_2$O   (1)

LiMnO$_4$+MnCO$_3$→½Li$_2$O+MnO$_2$+MnCO$_3$+½O$_2$   (2)

Li$_2$O+2MnO$_2$+2MnCO$_3$+O$_2$→Li$_2$Mn$_4$O$_9$+2CO$_2$   (3)

Theoretical TG weight plateaus are calculated from the gravimetric factors determined from the molecular weights of the solid phases. The experimental TG plateau values are determined from the ratio of successive plateaus. Thus, the experimental TG values for the three reactions are 0.8137, 0.8976, 0.8702. These measured values are in agreement with the theoretical values of 0.8167, 0.9003, and 0.8708. The measured weight plateau, 63.53%, for the overall reaction, shown in reaction (4) below, is in agreement with the theoretical value of 64.03%, with the discrepancy attributed to the simultaneous decomposition of the product at temperatures above about 400° C. At a heating rate of 2° C./min, the TG experiment lasted only about 220 minutes. Therefore much longer reaction times, as described later, are required for the preparation of the highly oxidized spinel material.

2(LiMnO$_4$·3H$_2$O)+2MnCO$_3$→Li$_2$Mn$_4$O$_9$+2CO$_2$+6H$_2$O+½O$_2$   (4)

The solid-state synthesis of the fully oxidized Li$_2$Mn$_4$O$_9$ phase is highly dependent on the calcination time and temperature. If the temperature is too low, it may not be possible to achieve a high degree of oxidation, even after several days of heating, because of the slower reaction kinetics. At higher temperatures, competition between the formation of the spinel and the reverse (decomposition) reaction can occur. This critical temperature dependence was investigated by TG analysis. An incompletely oxidized spinel was prepared by heating the precursors in a tube furnace at 400° C. under oxygen. A portion of the material was transferred to the TG apparatus and heated at a slow rate of 1° C./min in oxygen starting at ~200° C. The TG behavior showed a steady increase in weight over the next 100 minutes as the spinel slowly oxidized. No further oxidation was observed between about 340 and 400° C. Above 400° C., the spinel material began to slowly lose oxygen as it decomposed back to Li$_2$Mn$_4$O$_8$. This does not preclude decomposition of the spinel at lower temperatures provided sufficient calcination time is allowed. A decrease in the oxidation state of Mn occurs in the spinel upon excessive heating at 365° C.

As described in A. de Kock, M. H. Rossouw, L. A. de Picciotto, M. M. Thackeray, W. I. F. David and I. M. Ibberson. *Mater. Res. Bull.* 25 (1990), Li$_2$Mn$_4$O$_9$ decomposes with a loss of oxygen when heated above 400° C. for long periods of time, according to reaction (5), below:

Li$_2$Mn$_4$O$_9$→2LiMn$_2$O$_4$+½O$_2$   (5)

It has been reported in J. Tarascon, W. Mckinnon, F. Coowar, T. Bowmer, G. Amatucci and D. Guyomard. *J. Electrochem. Soc.* 141 (1994), that at higher temperatures, the product of reaction (5), LiMn$_2$O$_4$, will decompose according to reaction (6), below:

3LiMn$_2$O$_4$→3LiMnO$_2$+Mn$_3$O$_4$+O$_2$   (6)

The two-step thermal decomposition of the theoretical "Li$_2$Mn$_4$O$_9$", shown by reactions (5) and (6) above, was characterized by TG analysis (see e.g., S. Dallek, in: Proceedings of the 38th Power Sources Conference, 1998) and by X-ray studies. Separable TG weight plateaus were established by selecting optimal experimental parameters such as small sample size, slow heating rate and inert atmosphere. The oxygen content of the starting material was then determined from the appropriate gravimetric factors and the measured plateau values.

Figure 3:
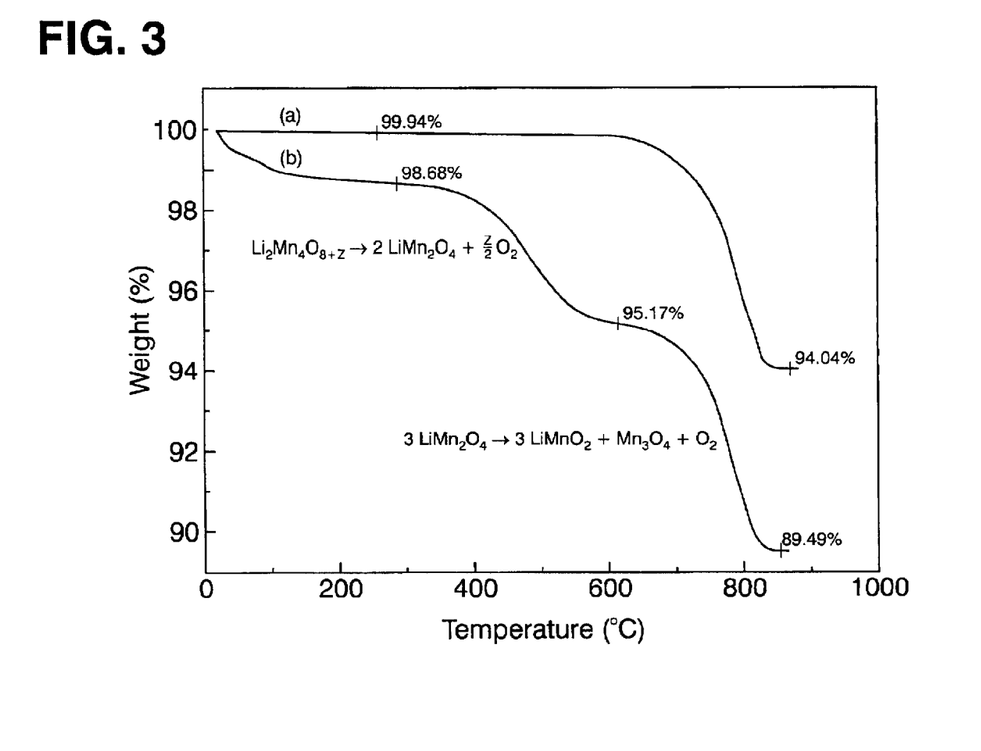
FIG. 3 shows TG curves of (a) commercial $LiMn_2O_4$ cathode material; (b) highly oxidized $Li_2Mn_4O_{8+z}$ material at a heating rate of 10° C./min in a helium atmosphere.

TG curves of a commercial LiMnO$_4$ sample and the highly oxidized Li$_2$Mn$_4$O$_9$ material of the present invention are shown in FIG. 3. The samples were heated at a rate of 10° C./min in an atmosphere of flowing helium. The weight plateau ratio (94.04/99.94) in curve (a) for the LiMn$_2$O$_4$ sample is in exact agreement with the theoretical value of 94.10% calculated from reaction (6) above. The first weight loss for the highly oxidized material, curve (b), occurring from room temperature to about 300° C., is due to the evolution of adsorbed and combined water. The second weight loss, from about 300–600° C., is attributed to the decomposition of nominally named "Li$_2$Mn$_4$O$_9$" according to reaction (5) above. The third weight loss, from about 600–800° C., is attributed to the decomposition of LiMn$_2$O$_4$ according to reaction (6) above. Mn$_3$O$_4$ forms as a result of the decomposition of Mn$_2$O$_3$ at temperatures above 650° C. in an inert atmosphere. The values of non-horizontal weight plateaus were determined from the minima in the TG derivative curves.

The oxygen content, z in $Li_2Mn_4O_{8+z}$, was determined by equating the molecular weights of the solid phases to the TG weight plateaus as follows:

$$Li_2Mn_4O_{8+z} \rightarrow 2LiMn_2O_4 + Z/2O_2 \qquad (7)$$

$$\frac{2LiMn_2O_4}{Li_2Mn_4O_{8+z}} = \frac{361.62922}{361.6292 + 15.9994z}$$

Therefore $z = \frac{95.17\%}{98.68\%}$ $z = 0.83$

The final weight loss, attributed to the known decomposition reaction of $LiMn_2O_4$ (reaction (6)), was used as a corroborative measurement for the TG method. The theoretical plateau value, obtained from the ratio of the molecular weight of the products and reactants in reaction (6), is 0.9410. As shown in FIG. 3, the experimental value, obtained from the ratio of the final plateaus (89.49%/95.17%), was 0.9403. This agreement between the calculated and measured values provides strong evidence for the validity of the TG method for determining the oxygen content in the nominal compound $Li_2Mn_4O_{8+z}$. Implicit in the TG method is the assumption that the material is single phase and the atomic ratio of Mn to Li in the spinel phase is indeed 2. The method can be used for other Mn/Li ratios by adjusting the Li and Mn subscripts in reaction (7). If the material is not single phase, then TG analysis will show significant deviations from the theoretical value of 0.9410. The phase purity of the spinels was confirmed by XRD analysis. In highly oxidized spinels, such as sample 6 (see Table 1, below), there was also agreement between the TG analysis and the chemical analysis.

The effect of synthesis temperature, time, and oxygen partial pressure on the extent of oxidation of the material was investigated by thermogravimetry (TG). X-ray diffraction (XRD), potentiometric titration, thermogravimetry, and elemental analyses were used to determine the stoichiometry of the product.

Derivative thermogravimetry (DTG) provides important insights into the thermal behavior of materials that are not readily apparent from inspection of the parent TG curve. For example, highly asymmetric or split peaks may be indicative of complex decomposition mechanisms or the presence of extraneous phases. Such phases are usually undetectable by XRD because of the extreme similarity of the manganese spinel XRD patterns. DTG curves of highly oxidized $Li_2Mn_4O_{8+z}$ phases revealed symmetric derivative peaks in the temperature range 300–600° C. Poorly oxidized material, on the other hand, displayed asymmetric peaks or a prominent shoulder at 410° C. This can be caused by the simultaneous decomposition of the unreacted $MnCO_3$ precursor. The evolution of $CO_2$ was detected by simultaneous TG/FTIR measurements using samples that had large DTG peak shoulders. In general, $CO_2$ evolution correlated with the peak at 410° C. This is virtually identical to the observed DTG decomposition peak temperature of our $MnCO_3$ precursor material. A highly oxidized "$Li_2Mn_4O_9$" material, having asymmetric DTG curve, showed no evidence of $CO_2$ evolution.

Figure 5:
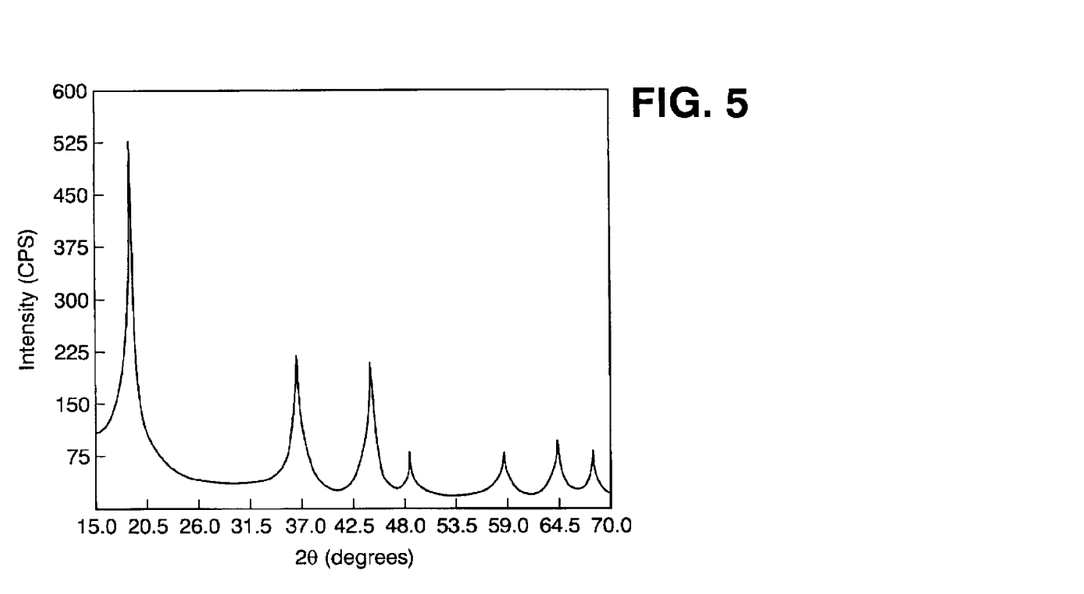
FIG. 5 shows a plot of the X-ray diffraction pattern of oxidized spinel of sample 5C in Table 1.

Spinel materials, as described later in Table 1 (see FIG. 4), were prepared in oxygen by heating precursor mixtures for extended periods of time, such as from about 17 hours to about 165 hours at 365° C. and 400° C. A typical X-ray diffraction (XRD) powder pattern for sample 5C, heated for 122 hours is shown in FIG. 5. The XRD data indicated that only a single phase was present. As cited by Xia and Yoshio (see i.e., Y. Xia and M. Yoshio. *J. Electrochem. Soc.* 144 (1997)), however, small amounts of impurities are difficult to distinguish by XRD. The lattice parameter for sample 5B, which is equivalent to $Li_{1.97}Mn_{4.00}O_{8.54}$, determined to be 8.142 Å. The oxidation state of manganese in this sample was determined by potentiometric titration to be +3.816. It is well known (see e.g., C. Masquelier, M. Tabuchi, K. Ado, R. Kanno, Y. Kobayashi, Y. Maki, O. Nakamura and J. B. Goodenough. *J. Solid State Chem.* 123 (1996)) that the lattice parameter decreases with increasing manganese oxidation state. Since attempts to prepare fully oxidized $Li_2Mn_4O_9$ have never been demonstrated, it is believed that these materials have lattice parameters more in agreement with manganospinels having lower oxidation states.

Table 1, shown in FIG. 4, provides a chemical analysis of lithium manganospinels of the present invention. The various sample of Table 1, Samples 1A–6C, were prepared by the solid state reaction of a one to one stoichiometric mole ratio of $LiMnO_4$ with $MnCO_3$. This mixture was intimately ground and placed in a porcelain boat and heated slowly in a tube furnace under a flowing atmosphere of oxygen gas at the cited temperatures and calcination times. At several intervals the mixture was re-ground and the calcination process continued.

Chemical analyses were performed on samples prepared under a variety of conditions. Some representative analysis data are shown in Table 1. The chemical analysis provides data for determining the total manganese oxides present, and the average oxidation state of the manganese. The efficacy of the analytical procedure was confirmed by determining the total percent manganese oxides in $Li_2Mn_4O_9(Li_2O.4MnO_2)$, wherein the theoretical value is 92.09% when all of the manganese is in the +4 oxidation state.

Although stoichiometric precursor mixtures were used, most of the spinel products were found to have a Li/Mn ratio slightly greater than the intended 1:2 ratio. This is attributed to some residual water in the $MnCO_3$. Furthermore, the presence of unreacted $MnCO_3$ could adversely affect the analysis. When a known amount of $MnCO_3$ was added to pre-analyzed commercial $LiMnO_4$, the $Mn^{4+}/Mn^{3+}$ ratio was dramatically reduced. This was not observed during analyses of spinels that were synthesized under appropriate conditions, further confirming the TG-FTIR data that the $MnCO_3$ had reacted completely.

Although the $Li_2Mn_4O_{8+z}$ notation implies an "oxygen-rich" spinel, a positive value of z implies overall cation deficiency, such as $Li_{1-x}Mn_{2-y}O_4$. For these "oxygen-rich" spinels, the values of x and y in Table 1, represent the vacancies in the tetrahedral (8a) and octahedral (16d) sites respectively, for a $Li_{8a[Mn]16d}O_4$ spinel. For a unit cell $LiMn_2O_4$, the number of total tetrahedral sites (lithium plus vacancies) is 1, and the total octahedral sites (Mn plus vacancies) is 2. The values of x and y may be calculated from valance balance. When the ratio of Li/Mn in a compound containing 1 mole Mn is n, and the average oxidation state of Mn is m, a spinel of composition $Li_{2n}Mn_2O_{n+m}$ has 8a vacancy sites, x, given by 1−8n/(n+m) and 16d vacancies, y, given by 2−8/(n+m). A value of z, which shows the extent of oxidation of a spinel of nominal composition $Li_2Mn_4O_{8+z}$, was calculated from the ratio of Li/Mn in which the concentration of Mn was normalized to 4 moles in the spinel composition.

To determine the effects of different oxidizing environments, the synthesis was performed at 400° C. for 17 hours in air, oxygen, and in an ozone-oxygen atmosphere. Some samples were further treated with 30% hydrogen peroxide. The data for samples 1A (air), 1B ($O_2$) and 1C (mix of $O_2$ and ozone) in Table 1 show that oxygen was more effective than air in producing an oxygen-rich spinel.

A lithium-rich spinel (sample 2) was produced when precursors were heated under oxygen for 70 hours and then heated an additional 18 hours with excess 30% hydrogen peroxide. Heating the sample for another 44 hours with peroxide produced no additional oxidation. Based on these results, we selected oxygen as the optimal oxidizing atmosphere.

The effect of numerous intermittent grinding procedures during synthesis of the spinel was investigated. These syntheses were conducted at 390° C. since higher temperatures appeared to be detrimental to forming the highly oxidized spinel. The analytical results for sample (3A), heated for 21 hours, are shown in Table 1. Analysis showed that the oxidation state of Mn progressively increased through 36 hours of heating, achieving a value of +3.744. After the next sample was taken at 51 hours, the oxidation state of Mn had decreased. Samples heated for <4 hours displayed the multi-peak DTG behavior discussed earlier, with a dominant $MnCO_3$ peak at ~410° C. As the grinding and heating procedure progressed to 8 hours and beyond, smoother DTG curves were observed. The procedure was repeated using a similar precursor mixture. The products were analyzed after calcination for 20, 27, 39 (sample 4A), and 48 (sample 4B) and 60 hours. The oxidation state of Mn was observed to reach a maximum after 48 hours. With these precursors, the best results required approximately 48 hours calcination at 390° C. The preparation of these materials in a reproducible manner is requires careful selection of the precursors and the calcination temperature and time.

The effect of lower synthesis temperatures was investigated. Using small (~3 g) samples, the decomposition of the product, represented by $k_d$, began to exceed the rate of formation of the spinel, $k_f$, after ~48 hours at 390° C. This is illustrated by the competing reactions of the synthesis.

$$2LiMnO_4 - 2MnCO_3(\kappa_{\bar{L}}) \rightarrow Li_2O + 2MnCO_3 + 1.5O_2 \rightarrow \tfrac{1}{2}O_2 +$$

$$Li_2Mn_4O_9 + 2CO_2(\kappa_d) \rightarrow 2LiMn_2O_4 + \tfrac{1}{2}O_2 + 2CO_2$$

To decrease the rate of the reverse (decomposition) reaction, the synthesis procedure was carried out at 365° C. After intervals of 21, 41, 67, 94, and 122 hours of intermittent grinding and heating at 365° C., the average oxidation state of Mn was 3.70, 3.70, 3.816, 3.782 and 3.778, respectively. Thus, it is clear that a maximum in the Mn oxidation state occurs despite the lower reaction temperature. The analytical data for 41, 67 and 122 hours (samples 5A–5C), are shown in Table 1. Table 1 shows that the average Mn oxidation state was higher in the material synthesized at 365° C. than in the 390° C. material although more time was required at 365° C. to achieve a highly oxidized material. Analysis showed the oxidation state of Mn increased with decreasing reaction temperatures, from 400 to 390–365° C.

TG analysis showed that spinel materials picked up atmospheric moisture to different degrees. Whereas TG curves showed that $LiMn_2O_4(Li_2Mn_4O_8)$ samples were completely anhydrous (FIG. 3a), spinels in which the value of z>0 had a propensity to adsorb atmospheric moisture. As shown in FIG. 3b, the highly oxidized spinel material contains a considerable amount of adsorbed and combined water that is evolved from room temperature to about 250° C.

The effect of the permanganate water of hydration was examined. As shown in Table 1 spinels prepared from the anhydrous permanganate (6A–6C) were more highly oxidized than those prepared from the hydrated precursor (5A–5C) when prepared under identical conditions. Compare 5A with 6A and 5C with 6B. The composition of sample 6B was not determined by chemical analysis. Instead, the oxygen content of sample 6B was determined by TG to be z=0.85. From this result, and assuming a Li/Mn ratio of 1:2, the oxidation state of Mn, m, was calculated to be 3.91. These TG results are in very good agreement with the chemical analysis data for samples 6A and 6C.

Figure 6:
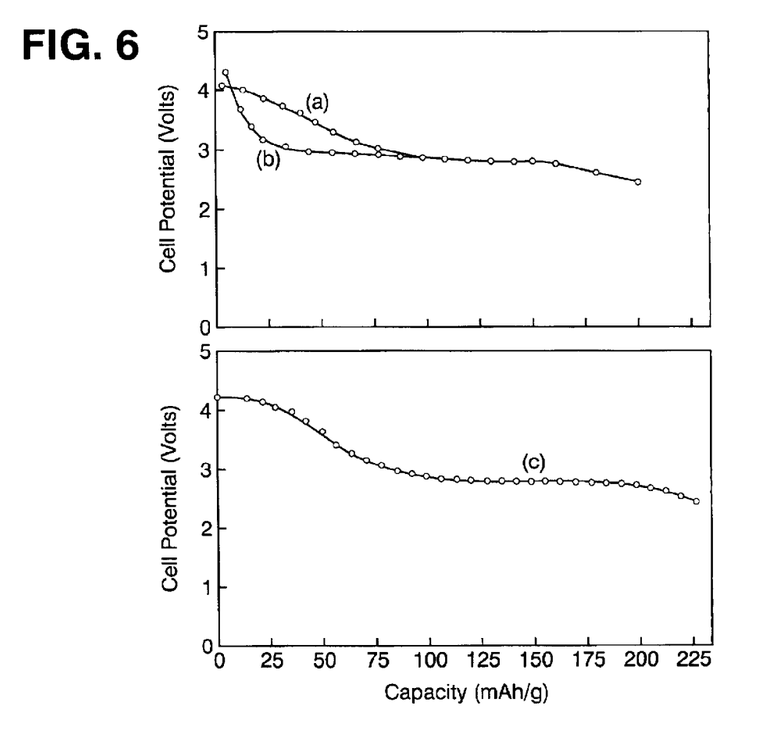
FIG. 6 shows a plot of the discharge behavior of $Li_2Mn_4O_{8+z}$ cathode material: (a) 4th cycle; (b) 8th cycle of sample 4B at 0.1 mA/cm$^2$ in 1 M $LiAsF_6$/PC; (c) 1st cycle of sample 6C at 1.5 mA/cm$^2$ in 1 M $LiPF_6$ in EC/EMC.
Figure 7:
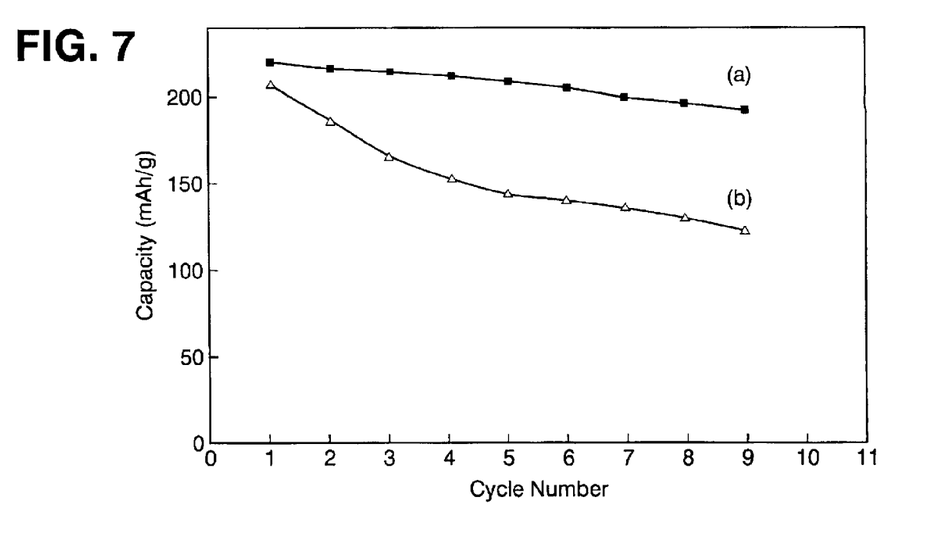
FIG. 7 shows a comparison of capacity retention of spinel cathode materials in coin cells of (a) Sample 5C and (b) $LiMnO_4$.

The electrochemical performance of several spinel materials samples 4B, 5C, 6C, and commercial $LiMn_2O_4$, was evaluated as cathodes in prismatic laboratory cells. The cycling performance of sample 4B was evaluated using 1 M $LiAsF_6$/PC electrolyte. During the initial cycling, the discharge curves did not show any sharp voltage transition as might be expected for a low crystalline defect spinel. The initial discharge revealed a small 4 V plateau with a gradual transition into a 3 V plateau. The initial capacity of the fourth cycle is shown in FIG. 6a. The discharge curve, shown in FIG. 6b, that occurs after eight shallow cycles at 0.1 $mA/cm^2$ displays primarily a 3.0 V plateau.

The cycling behavior was evaluated using 1 M $LiP_6EC$/EMC electrolyte in order to increase the rate capability. Samples 5C and 6C were cycled between 4.5 and 2.5 V at 1.5 $mA/cm^2$. Very little initial charge acceptance was observed in sample 6C because of the high oxidation state of Mn in the spinel. This highly oxidized spinel now gives rise to two voltage plateaus. The initial discharge capacity of sample 6C, shown in FIG. 6c, exceeded the 213 mAh/g expected for a 3-faraday reduction. Upon replacing the lithium, separator and electrolyte after 10 cycles, an 8% increase in capacity was observed, indicating components other than the cathode contributed to some loss of capacity upon cycling.

In general, both the commercial $LiMn_2O_4$ and the spinel cathodes herein gave poor cycling performance in the prismatic cells. This loss of capacity was attributed to poor electrode compression. Thus, the cycling behavior of a cathode prepared from sample 5C was compared with a similarly prepared $LiMn_2O_4$ cathode in coin cells, using a lithium anode and EC-DMC-DEC electrolyte. The cells delivered 9 cycles before the lithium anode began to short each cell. In contrast to the $LiMn_2O_4$ cathode, however, the cathode prepared from sample 5C retained capacity over the first few cycles. As shown in FIG. 5, the cathode made from sample 5C provided excellent total capacity relative to the $LiMn_2O_4$ cathode.

Highly oxidized $Li_2Mn_4O_9$ defect spinel materials have been prepared from $LiMnO_4$ and $MnCO_3$ precursors. A z value of 0.88 in $Li_2Mn_4O_{8+z}$ was obtained. The materials were characterized using chemical, TG and XRD analyses. Electrochemical discharge proved to have excellent capacity (>200 mAh/g) and capacity retention relative to $LiMn_2O_4$ when single cells were cycled from 4.5 to 2.5 V in coin cells.

EXAMPLE 1

Figure 8:
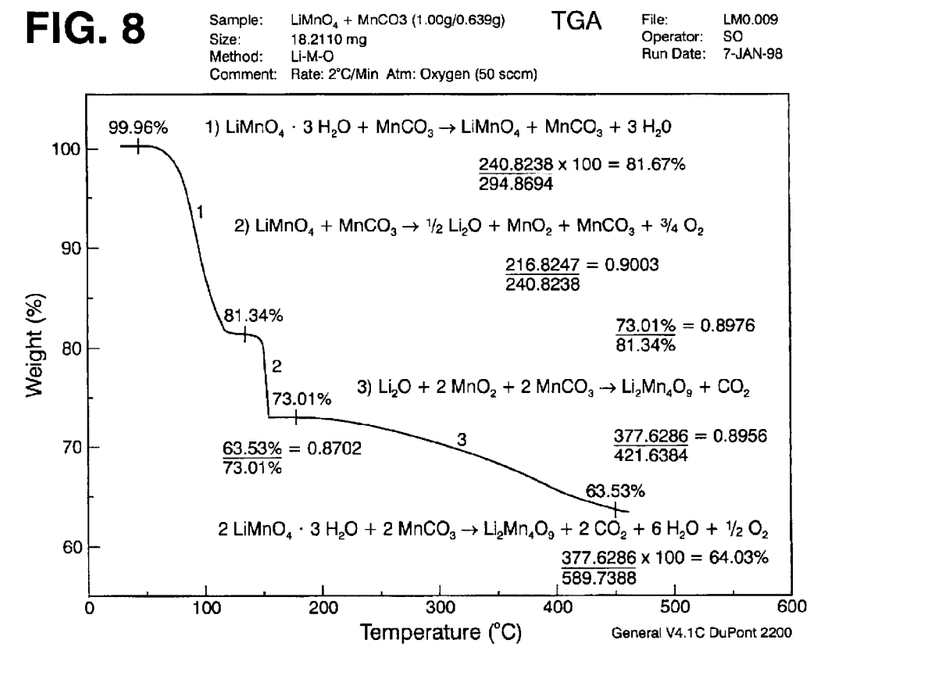
FIG. 8 shows a TG analysis of the $Li_2Mn_4O_{8+z}$ of the present invention.

$LiMnO_4 \cdot 3H_2O$ and $MnCO_3$ were ground with a mortar and pestle and finely mixed together until homogeneous. Approximately 5 mg to 10 mg of the mixture was used for TGA synthesis. A TGA synthesis processing of the finely mixed $LiMnO_4 \cdot 3H_2O$ and $MnCO_3$ constituents included slow heating of 5° C./min in $O_2$ to 160° C. followed by rapid heating Of about 30° C./min to 450° C., followed by rapid cooling to ambient temperature. The TGA synthesis was done as a preliminary investigatory step. Unlike the other examples that used larger amounts of $LiMnO_4 \cdot 3H_2O$ and $MnCO_3$, i.e., generally about 5 grams, the small amount of mixed $LiMnO_4 \cdot 3H_2O$ and $MnCO_3$ resulted in a high surface to volume ratio that did not facilitate homogeneous mixing during melt. The results are shown in FIG. 8. The first weight loss resulted from the release of water of hydration, which theoretically is given by the ratio of 240.824/294.869=81.67%. The actual residual of 81.34% indicated the possibility that the starting constituents were not completely dry. Over the next two plateaus, a predicted mass change mass ratio of 0.9003, actually was 0.8976. This possibly indicated an insufficient oxygen pickup during the heating in $O_2$. The final reaction, anticipated at 64.03% was 63.53% as the temperature of 450° C. is reached. This likely showed partial decomposition of the final $Li_2Mn_4O_{8+z}$ product at 450° C.

EXAMPLE 2

Figure 9:
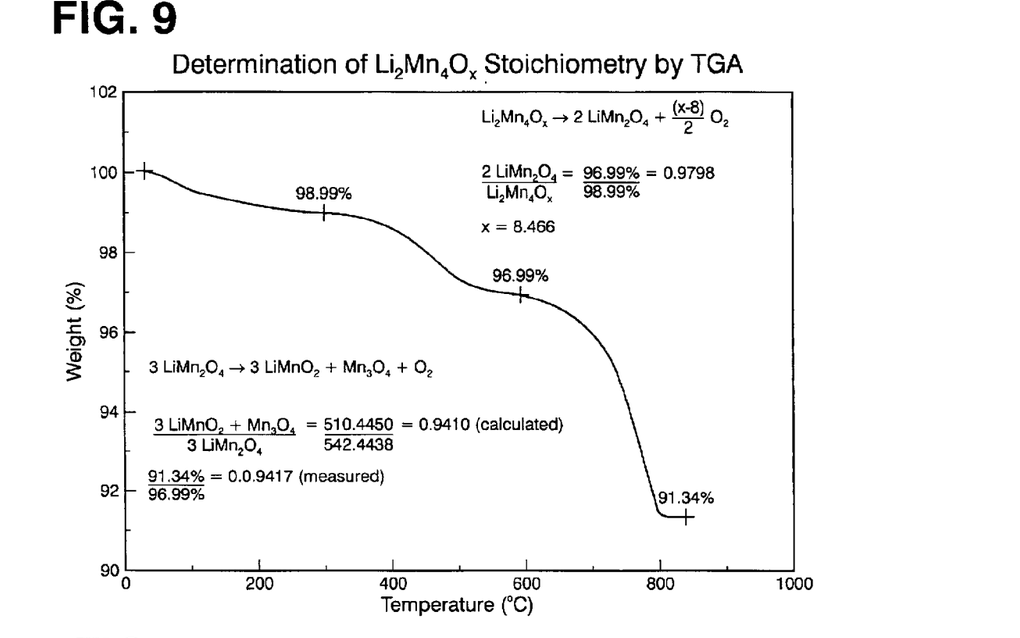
FIG. 9 shows a TG analysis of the $Li_2Mn_4O_{8+z}$ of the present invention.

$LiMnO_4 \cdot 3H_2O$ and $MnCO_3$ were weighed in stochiometric amounts and intimately ground in a mortar and pestle, placed in a porcelain boat into a tube furnace under a stream of flowing oxygen. The $LiMnO_4 \cdot 3H_2O$ and $MnCO_3$ mixture was heat to 160° C. at approximately 2° C./min to form a melt. The melt was heated in $O_2$ for approximately 60 hours at 400° C. The results are shown in FIG. 9. As seen in the TG curve of FIG. 9, the sample was heated at a rate of 10° C./min in a flowing atmosphere of helium. The first weight loss, from room temperature to about 300° C., resulted from the release of water of hydration. The second weight loss, from about 300° C. to about 600° C., resulted from the decomposition of the $Li_2Mn_4O_{8+z}$ product ($Li_2Mn_4O_9 \rightarrow 2LiMn_2O_4 + \frac{1}{2}O_2$). The third weight loss, from about 600° C. to about 800° C., is assumed to have resulted from the decomposition of $LiMn_2O_4$, according to $3LiMnO_4 \rightarrow 3LiMnO_2 + Mn_3O_4 + O_2$. The plateau values were determined precisely from a simultaneous plot of weight loss derivative curve. Knowing the Li/Mn ratio and oxidation state of Mn, the oxygen stoichiometry in $Li_2Mn_4O_x$ was determined using TG weight plateaus and the appropriate gravimetric factors. The final weight loss, attributed to the known decomposition reaction of $LiMn_2O_4$, used as a corroborative measurement. As seen in FIG. 9, measured weight plateaus for the decomposition of $LiMn_2O_x$ and $LiMn_2O_4$ are in close agreement with the theoretical calculated weight loss, give x a value of 8.46.

EXAMPLE 3

Figure 10:
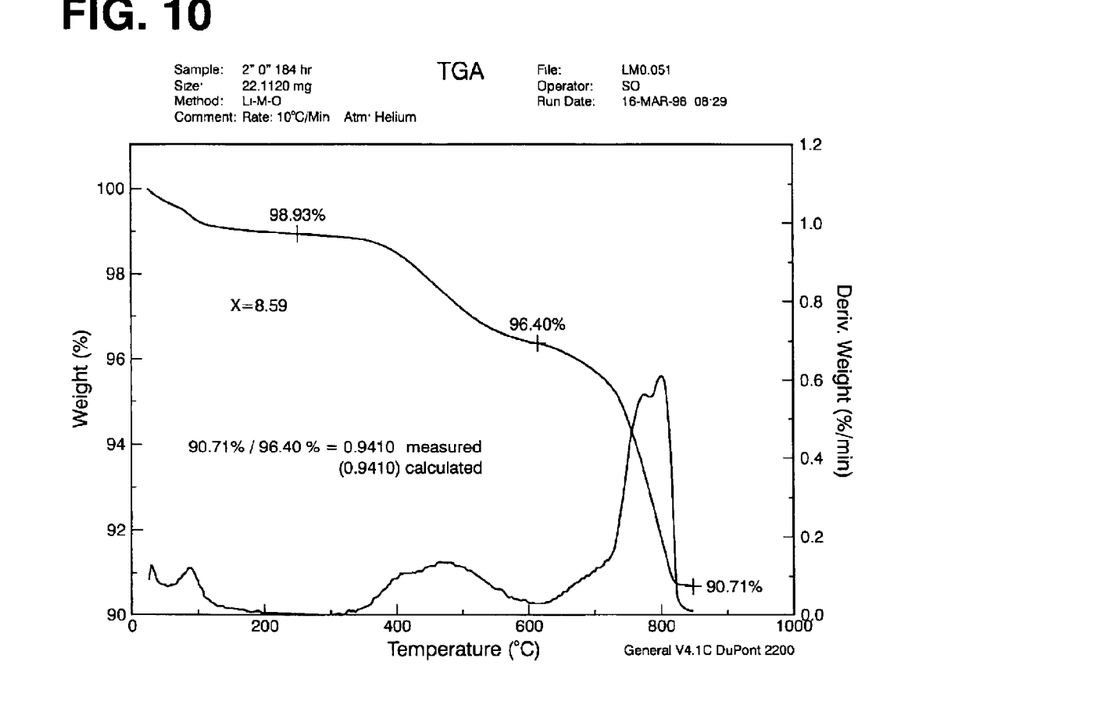
FIG. 10 shows a TG analysis of the $Li_2Mn_4O_{8+z}$ of the present invention.

The procedures of Example 2 were followed with the exception that after heating to 160° C., the melt was heated in $O_2$ for approximately 184 hours at 400° C. in order to further decompose any residual carbonates. The results are shown in FIG. 10. The decomposition weight ratios yielded an estimated x value of 8.59.

EXAMPLE 4

Figure 11:
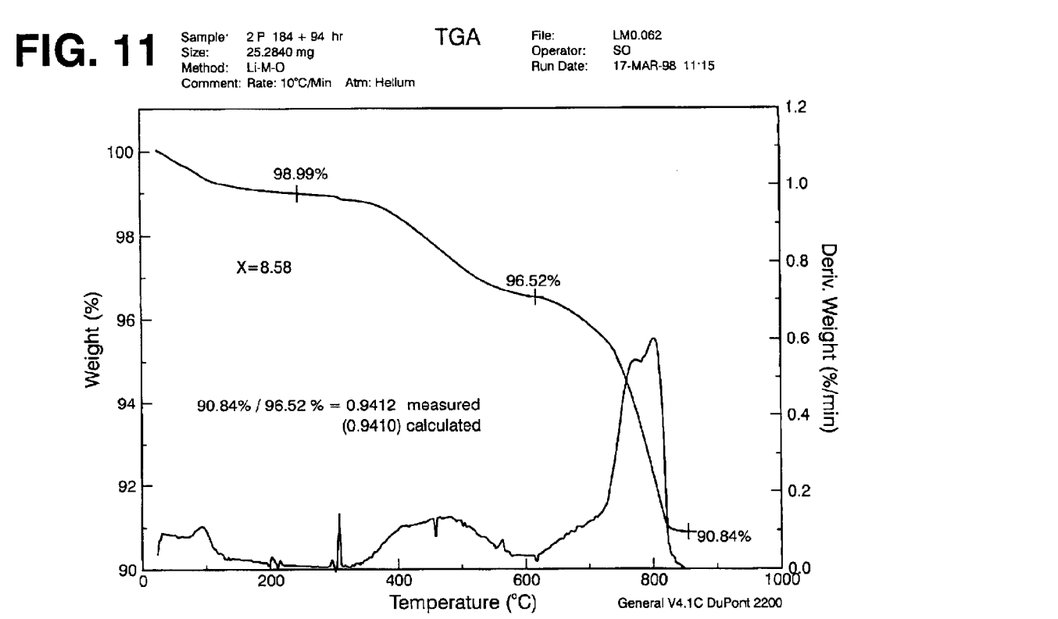
FIG. 11 shows a TG analysis of the $Li_2Mn_4O_{8+z}$ of the present invention.

The procedures of Example 2 were followed with the exception that after heating to 160° C., the melt was heated in $O_2$ for approximately 278 hours at 400° C. The results are shown in FIG. 11. The decomposition weight ratios yielded an estimated x value of 8.58.

EXAMPLE 5

Figure 12:
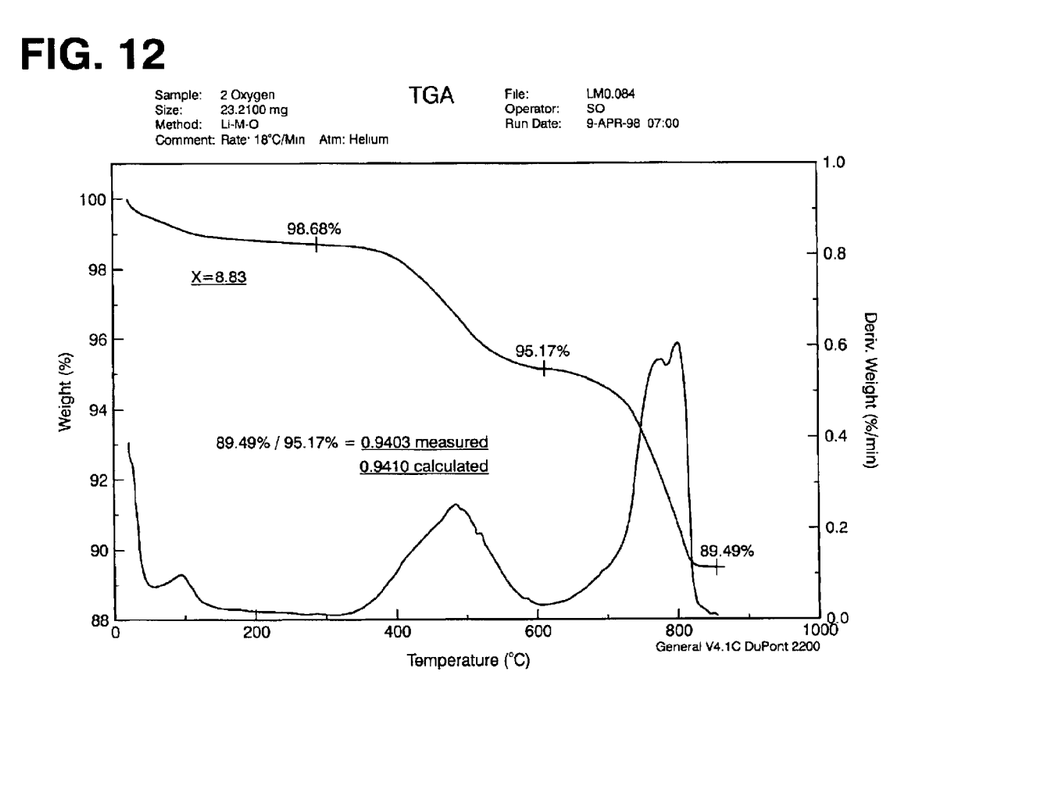
FIG. 12 shows a TG analysis of the $Li_2Mn_4O_{8+z}$ of the present invention; and, FIG. 13 shows a TG analysis of the $Li_2Mn_4O_{8+z}$ of the present invention.

The procedures of Example 2 were followed with the exception that after heating to 160° C., the melt was heated in $O_2$ for approximately 17 hours at 400° C. in order to reduce any decomposition of the product. The results are shown in FIG. 12. The decomposition weight ratios yielded an estimated x value of 8.59.

Test electrodes, fabricated by pasting on perforated aluminum substrates, showed relative discharge capacities of from about 200 ma-hrs/g or greater, such as up to approximately 230 ma-hrs/g (for approximately 10 cycles), compared with approximately 135 ma-hrs/g for commercial material having lithium metal anodes.

EXAMPLE 6

Figure 13:
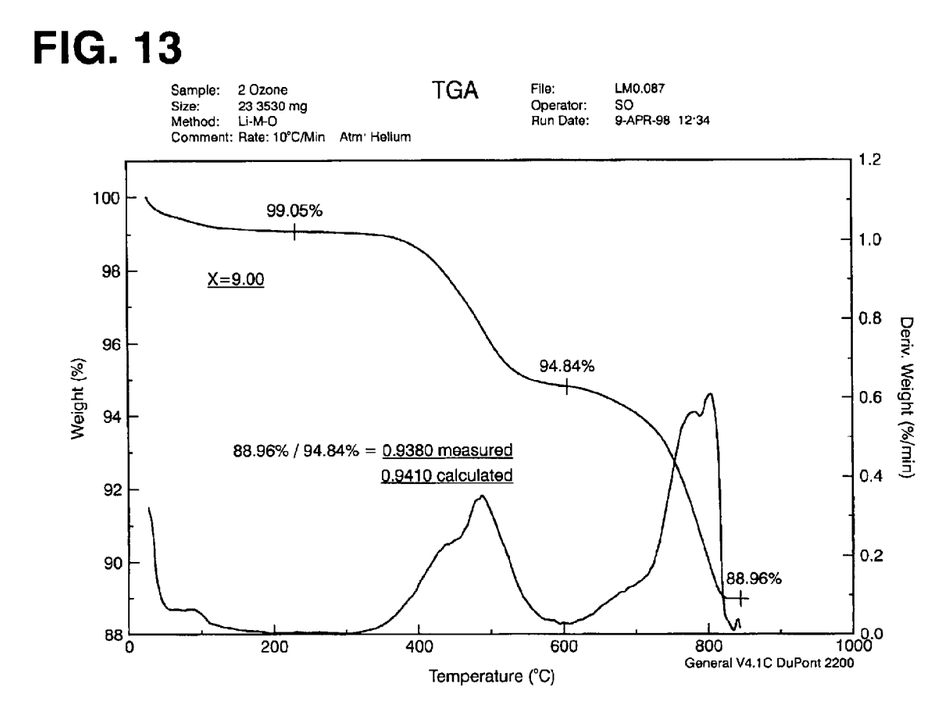

The procedures of Example 2 were followed with the exception that after heating to 160° C., the melt was heated in $O_2$ with from about 0.5% to about 1% ozone from an ozone generator for approximately 17 hours at 400° C. in order to enhance oxygenization. The results are shown in FIG. 13.

The foregoing summary, description, and examples of the present invention are not intended to be limiting, but are only exemplary of the inventive features which are defined in the claims.

What is claimed is:

1. A process for making $Li_2Mn_4O_{8+z}$, wherein z is greater than zero and less than 1, comprising the steps of:

mixing lithium permanganate with a precursor selected from the group consisting of MnOOH, $MnO_2$ and $MnCO_3$ in approximately stoichiometric amounts;

heating said mixture to a temperature of from about 350° C. to about 400° C. for of from about 40 hours to about 165 hours in an oxygen atmosphere;

mixing intermittently said mixture of lithium permanganate with said precursor; and forming $Li_2Mn_4O_{8+z}$, wherein z is greater than zero and less than 1.

2. The process of claim 1, wherein the precursor comprises MnOOH.

3. The process of claim 1, wherein the precursor comprises $MnO_2$.

4. The process of claim 1, wherein the precursor comprises $MnCO_3$.

5. The process of claim 1, wherein the lithium permanganate comprises $LiMnO_4 3H_2O$.

6. The process of claim 1, wherein the step of mixing results in a thoroughly blended mixture.

7. The process of claim 1, wherein the step of heating results in a melt.

8. The lithium permanganate of claim 1 is anhydrous.

9. A process for making $Li_2Mn_4O_{8+z}$, wherein z is greater than zero and less than 1, comprising the steps of:

mixing anhydrous lithium permanganate with $MnCO_3$ in approximately stoichiometric amounts;

heating said mixture to a temperature of from about 350° C. for of from about 165 hours in an oxygen atmosphere;

mixing intermittently said mixture; and forming $Li_2Mn_4O_{8+z}$, wherein z is greater than zero and less than 1.

* * * * *